United States Patent [19]

White

[11] Patent Number: 4,485,137
[45] Date of Patent: Nov. 27, 1984

[54] CONCRETE CURING BLANKET

[76] Inventor: Richard L. White, 15803 Parksley Dr., Houston, Tex. 77059

[21] Appl. No.: 463,406

[22] Filed: Feb. 3, 1983

[51] Int. Cl.³ .............................................. B32B 3/00
[52] U.S. Cl. .................................... 428/57; 428/218; 428/219; 428/283; 428/286; 428/290; 428/296; 428/300; 428/323; 428/328; 428/402
[58] Field of Search ................ 428/57, 290, 283, 300, 428/301, 323, 328, 58, 296, 192, 218, 219, 286, 290, 402

[56] References Cited

U.S. PATENT DOCUMENTS 4,035,543 7/1977 Draper et al. ...................... 428/300

Primary Examiner—James J. Bell
Attorney, Agent, or Firm—Vaden, Eickenroht, Thompson, Bednar & Jamison

[57] ABSTRACT

An improved concrete curing blanket of light weight, high water retention and wicking action, and connectable into coverage of large concrete surface. The blanket has a surface layer (e.g. three mils) of low density polyethylene carrying any pigments that is heat sealed as a melted coating upon a batting layer (e.g. one-tenth inch) of a porous and resilient, non-woven, synthetic needle-punched fabric. Adjacent pieces of the blanket are heat sealed together to cover large areas of curing concrete. The batting layer conforms to the irregularities of the concrete surface to promote wetting action and enhance the curing function.

8 Claims, 3 Drawing Figures

U.S. Patent  Nov. 27, 1984  4,485,137
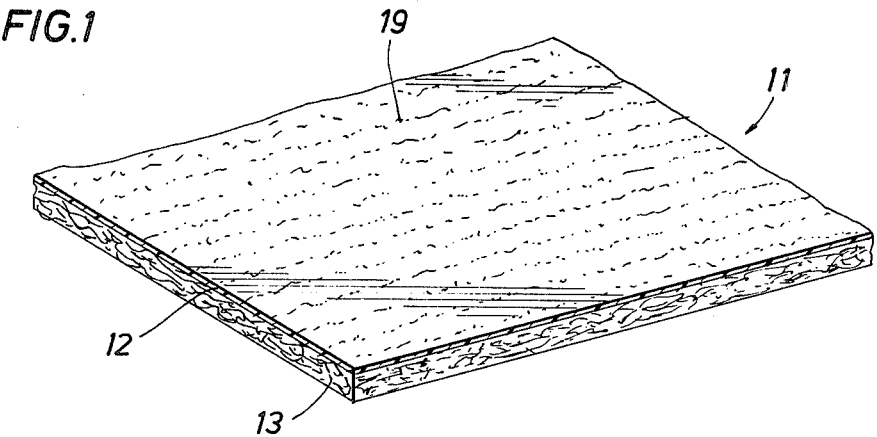
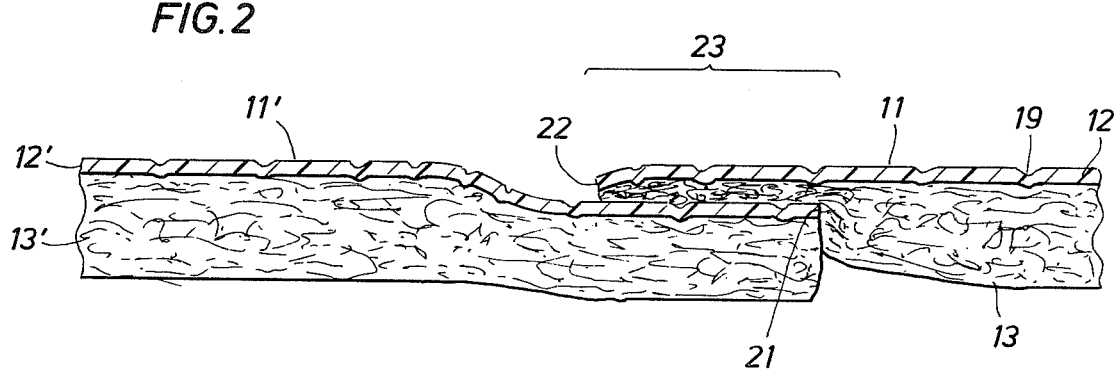
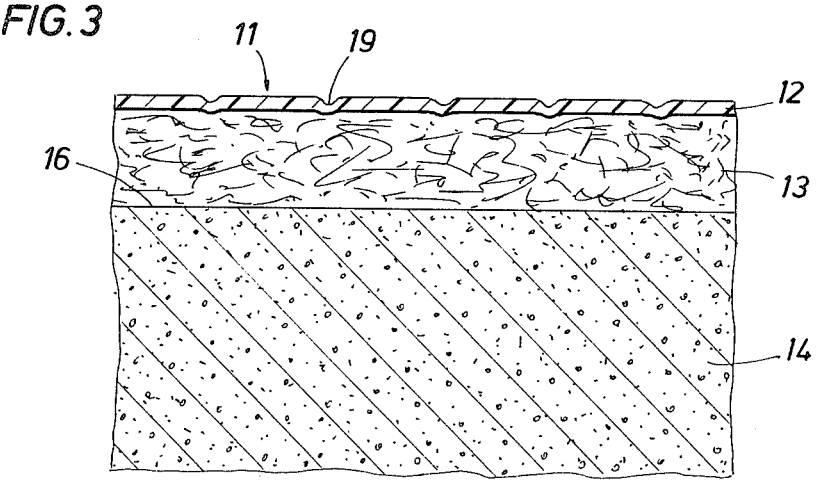

CONCRETE CURING BLANKET

BACKGROUND OF THE INVENTION

1. Field of the Invention

This invention relates to concrete curing blankets, and it more particularly relates to these blankets formed by reinforced plastic sheets.

2. Background of the Invention

One of the requirements to produce quality concrete is its proper manipulation during curing. The curing process produces chemical changes timewise that relate to setting and hardening, and they continue to occur over a considerable period of time in the presence of water. Thus, concrete must be kept wet after it has set for as long a period as is practicable. Curing not only increases the strength of concrete and its structural value, but proper curing is necessary for the production of water-tight and durable concrete.

For example, if concrete is kept wet for the first ten days after setting, its strength and durability increase 75 percent over ordinary aging at dry surface conditions. Thus, concrete structures should be cured by adequate means. These means include drenching the forms etc. with water prior to pouring. Then, the concrete surface is kept damp by frequent sprinklings, but this means is labor intensive and expensive.

Horizontal surfaces of concrete have been covered by sand or canvas or burlap to maintain the desired dampness to promote curing. However, irregular concrete surfaces, such as steps, bridge columns, decks or walls cannot be covered but have had to be sprinkled periodically for the necessary damp condition.

It has been proposed to use concrete curing blankets to cover water-wetted concrete and thereby extend the duration of the damp condition. One blanket was formed of coarse, woven burlap fibers which were carried a thermoplastic sheet that was heat sealed or melted onto the fabric. Naturally, the burlap is hydrophillically greasy, subject to rotting, and the water wetting the concrete in part was absorbed by these natural fibers. Also, large void areas were present in the burlap weave which promote non-uniform wetting of the concrete surface, especially if it is irregular or non-horizontal. The blanket is relatively stiff and unyielding and thus, it tends not to conform to surface irregularity. If the blanket is slid upon irregular concrete, the burlap fibers snag and hang to make placement difficult, and sometimes even causing the tearing of the blanket. After use, the blanket with burlap fibers could not be merely rolled and stored because of the bacterial action on the natural fibers which could even lead to spontaneous combustion hazards. Air or artifically drying the blanket so it can be reused is not only inconvenient but relatively expensive.

The present concrete curing blanket is light weight, maintains uniform wetness against the concrete and conforms to irregular surfaces, and it is not subject to bacterial degradation. It is readily joined between adjacent pieces by heat sealing to cover large concrete surfaces. Also, it can be rolled wet for transportation to the next site for curing concrete.

SUMMARY OF THE INVENTION

In accordance with this invention, there is provided an improved concrete curing blanket formed of a surface layer of low density, thermoplastic and a batting layer of a porous and resilient polymeric non-woven fabric with hydrophobic properties and sufficient filament length to promote water wicking properties. The surface layer is heat sealed and bonded into the upper portions of the batting layer but the surface layer remains nonperforated and nonporous to water. The blanket covers coextensively water wetted concrete irrespective of surface irregularities and water wetting occurs uniformly over the surface of the curing concrete. Adjoining blankets are heat sealed at their edges to provide a continuous nonperforated blanket across large areas of water wetted concrete.

DESCRIPTION OF THE DRAWINGS

FIG. 1 is a perspective showing a length of the concrete curing blanket of the present invention, and particularly its sheen-like reflective surface;

FIG. 2 is an enlarged section taken transversely through two of the blankets shown in FIG. 1, with the blankets heat sealed together; and FIG. 3 is an enlarged partial section of the blanket of FIG. 1 resting upon concrete undergoing wet curing.

DESCRIPTION OF THE PREFERRED EMBODIMENT

Referring to FIG. 1, there is shown an embodiment of the concrete curing blanket 11 arranged in accordance with this invention. Although the blanket 11 may have any shape and size, it is usually rectangular with a width of about six feet, a length of several tens of feet (e.g., 100 feet) and rolled upon a tubular core for easy handling by the user. If desired, the edges of the blanket can be provided with grommet and rope attachments for use on sloping or vertical concrete surfaces. The blanket 11 is light weight (e.g., six ounces per square yard) but it is most durable and reuseable without any special care features.

The blanket 11 is formed of a surface layer 12 and a batting layer 13, which layers are integrally secured together to produce a unitary and uniform composite covering for curing concrete.

The surface layer 12 is a water-impervious, low density thermoplastic in the nature of a thin film. For example, good results have been attained with low density polyethylene (a commercial product) which is a melt film coating approximately three mils in thickness, and with a weight of about two ounces per square yard. Preferably, the low density polyethylene carries aluminum or white pigments in an amount to render opaque the layer 12 to penetration by sun light. The melt coating of the layer 12 onto the layer 13 provides a permanent attachment between them.

The batting layer 13 is a porous and resilient polymeric filament or fiberous pad which will yieldably conform to the surface 16 of the concrete 14 covered by the blanket 11, as can be seen in FIG. 3. The batting layer 13 is also hydrophobic and inert so as not to suffer degradations under either wet, dry or chemical conditions. In addition, the batting layer 13 has good "wicking" properties so that the water wetting the concrete surface 14 will be uniformly maintained across such surface by "wicking" of excess water to drier areas through the layer 13. It is to be noted that the batting layer 13 does not absorb or retain water by absorption on the individual fibers of which is is formed.

Good results have been obtained where the batting layer 13 is a relatively thick, non-woven fiberous pad with a filament length (e.g., several inches) to promote its water wicking properties. Preferrably, this fabric has a relaxed state thickness of about one-tenth inch, and its needle punching fabrication provides a hairiness well suited for adhesion to the melt application of the surface layer 12. Usually, the polypropylene fabric will have a weight of about four ounces per square yard.

Preferrably, the surface layer 12 is applied by a melt extrusion procedure onto the batting layer 13. The temperature and application rate is controlled so that the surface layer 12 penetrates about one-fourth (or 25 mils) into the batting layer 12. As a result, good adhesion between the layers is readily obtained to produce a durable and strong blanket 11.

A blanket 11 was produced where a three mil layer 12 was applied by melt extrusion of low density polyethylene with opaque pigments onto a one-tenth inch thick pad of non-woven, needle-punched polypropylene fabric with about three inch long fibers and a weight of about four ounces per square yard. A comparison was made of this blanket relative to a conventional blanket using burlap fiber and having a weight of ten ounces per square yard.

The present blanket is only 45 percent as heavy per square yard as the conventional burlap fabric type. However, the present blanket will hold by capillary wetting action (or wicking) 50 percent more water than the conventional burlap fabric type. In addition, the present blanket has a high tearing strength in the nature from about 20 to 30 pounds.

An additional advantage of the "wicking" action in layer 13 is that the excess water from excess wet areas is rapidly redistributed to dry areas of the concrete. Also, the blanket 11 may be rolled wet, and rolling squeezes most of the water from the hydrophobic layer 13.

One great advantage of the present blanket is that its construction avoids stretching which makes openings in the layer 12 through which moisture is lost from the layer 13. The blanket 11 can be easily joined to an adjacent piece, such as blanket 11', as shown in FIG. 2. The blanket edges 21 and 22 are overlapped a few inches to form a heat sealed area 23. Sufficient heating and pressure is applied to the area 23 so that batting 13 from the upper blanket 11 was imbedded into the surface layer 12' of the lower blanket 11' to form both a mechanical and water tight joint between them. Thus, the nonporous and nonperforated nature of the surface layers 12 and 12' was preserved.

An important feature of the blanket 11 is the surface configuration of the layer 12. The hot melt extrusion of the layer 12 onto the layer 13 causes a unique surface configuration that has a sheen appearance formed of an irregularly pockmarked areas 19, as seen in FIG. 3. These areas 19 are random occurring and distort the surface layer 12 from a mirror-like, sun glare reflecting surface. Rather, these areas 19 make the surface layer 12 reflect sun light in a more diffused manner, much like satin-finished metal surfaces. Thus, the sun glare from the blanket 11 is much reduced and avoids discomfort to the workers about the curing concrete especially upon bright and clear sunny days.

From the foregoing, it will be apparent that there has been provided a novel improved concrete curing blanket with many new advantages for maintaining the desired water-wetted condition for extended periods of time. It will be apparent that certain changes or alterations in the present blanket can be made without departing from the spirit of the invention. These changes are contemplated by and are within the scope of the appended claims which define the invention. Additionally, the present description is intended to be taken as an illustration of this invention.

What is claimed is:

1. A concrete curing blanket comprising
   (a) a film-like surface layer without perforations of a nonporous low density thermoplastic;
   (b) a thick layer of porous and resilient polymeric filament batting adapted to yieldably conform to a concrete surface covered by the blanket, said batting being hydrophobic but having sufficient filament length to promote water wicking properties, and
   (c) said surface layer heat sealed and bonded only onto the upper portion of said batting layer but said surface layer remaining impervious to water and without perforations, whereby said blanket covers coextensively water-wetted concrete irrespective of surface irregularities and maintains water wetting uniformly across the surface area thereof, and said blanket heat sealable to an adjacent blanket to provide a continuous blanket across a large area of the water-wetted concrete.

2. The concrete curing blanket of claim 1, wherein said surface layer is low density polyethylene and said batting layer is polypropylene fabric of the non-woven type.

3. The concrete curing blanket of claim 2, wherein said low density polyethylene contains pigments.

4. The concrete curing blanket of claim 1, wherein said surface layer is a low density polyethylene of about three mils in thickness carried on said batting layer of non-woven polypropylene fabric of about one-tenth inch in thickness with a weight of about four ounces per square yard.

5. The concrete curing blanket of claim 4, wherein said surface layer includes pigments in said low density polyethylene.

6. The concrete curing blanket of claim 1, wherein said surface layer is provided by melt extrusion of low density polyethylene of a thickness of about three mils onto said batting layer which comprises non-woven, needle-punched polypropylene fabric of about one-tenth inch in thickness whereby the exposed surface of said surface layer is irregularly pockmarked but remains impervious to water thereby avoiding a mirror-like sun glare reflecting surface.

7. The concrete curing blanket of claim 6, wherein said low density polyethylene carries inorganic pigments, such as aluminum powder, or $TiO_2$ to make said surface layer opaque.

8. A concrete curing blanket comprising
   (a) a film-like surface layer of a low density polyethylene thermoplastic polymer carrying pigments so as to be opaque;
   (b) a thick layer about one-tenth in thickness of a porous and resilient polymeric fabric with hydrophobic properties, said fabric being a nonwoven, needle-punched polypropylene pad with a weight of about four ounces per square yard;
   (c) said surface layer provided by melt extrusion of the low density polyethylene with a thickness of about three mils onto said batting layer and penetrating some about one mil but yet leaving said surface layer impervious to water but with an irregularly pockmarked surface to provide a sheen-like sun reflecting surface but yet nonperforated; and (d) said surface layer being heat sealable to an adjacent piece of concrete curing blanket while retaining its nonporous and nonperforated character so as to provide a continuous blanket across a large area of water-wetted concrete
whereby said blanket covers coextensively the water wetted concrete and conforms to surface irregularities and maintains water wetting uniformly across the surface area thereof.

* * * * *

UNITED STATES PATENT AND TRADEMARK OFFICE
CERTIFICATE OF CORRECTION

PATENT NO. : 4,485,137

DATED : November 27, 1984

INVENTOR(S) : Richard L. White

It is certified that error appears in the above-identified patent and that said Letters Patent are hereby corrected as shown below:

ON THE TITLE PAGE INSERT:

-- Assignee: Reef Industries, Inc.,

Houston, Texas --.

Signed and Sealed this

Sixteenth Day of February, 1988

Attest:

DONALD J. QUIGG

*Attesting Officer*  *Commissioner of Patents and Trademarks*